United States Patent

Hinoki et al.

Patent Number: 6,117,484
Date of Patent: Sep. 12, 2000

[54] METHOD FOR PRODUCING MAGNETIC RECORDING MEDIUM

[75] Inventors: Kiyonori Hinoki; Kiyoto Fukushima, both of Nagano, Japan

[73] Assignee: TDK Corporation, Tokyo, Japan

[21] Appl. No.: 09/173,542

[22] Filed: Oct. 16, 1998

[30] Foreign Application Priority Data

Oct. 22, 1997 [JP] Japan ................................. 9-290014

[51] Int. Cl.$^7$ ....................................................... B05D 5/12
[52] U.S. Cl. ........................... 427/131; 427/130; 428/900
[58] Field of Search ................................... 427/131, 132, 427/130, 129; 428/900, 928

[56] References Cited

FOREIGN PATENT DOCUMENTS

| 0 661 104 | 7/1995 | European Pat. Off. |
|---|---|---|
| 0 782 132 | 7/1997 | European Pat. Off. |
| 3-120618 | 5/1991 | Japan |
| 5-059491 | 8/1993 | Japan |
| 7-185437 | 7/1995 | Japan |
| 7-185449 | 7/1995 | Japan |
| 9-185822 | 7/1997 | Japan |

*Primary Examiner*—Bernard Pianalto
*Attorney, Agent, or Firm*—Oblon, Spivak, McClelland, Maier & Neustadt, P.C.

[57] ABSTRACT

Disclosed is a method for producing a magnetic recording medium comprising coating both sides of a non-magnetic support with paints for formation of coating films, followed by simultaneous drying of the respective coating films, in which the following four requirements are fulfilled, taking the amount of the paint coated on one side (a magnetic layer side) of the non-magnetic support as "W MAG" and the amount of the paint coated on the other side (a backcoat layer side) thereof as "W BC":

$$2.0 \text{ g/m}^2 \leq \text{W MAG} \leq 40.0 \text{ g/m}^2 \quad (1)$$

$$2.5 \text{ g/m}^2 \leq \text{W BC} \leq 25.0 \text{ g/m}^2 \quad (2)$$

$$3 \text{ W MAG} \geq -16 \text{ W BC} + 70 \quad (3)$$

$$9 \text{ W MAG} \leq -10 \text{ W BC} + 385 \quad (4)$$

thereby being able to produce the magnetic recording medium excellent in electromagnetic characteristics, magnetic characteristics and running durability without deteriorating the appearance of a coated sheet roll.

6 Claims, 3 Drawing Sheets

METHOD FOR PRODUCING MAGNETIC RECORDING MEDIUM

FIELD OF THE INVENTION

The present invention relates to a method for producing a magnetic recording medium used for recording and reproducing images, sounds and data.

BACKGROUND OF THE INVENTION

Magnetic recording media in which magnetic recording layers containing magnetic powders are formed on non-magnetic supports have hitherto been provided with backcoat layers on surfaces of the non-magnetic supports opposite to the magnetic layers, for improving the running properties of the media themselves. Although such backcoat layers contribute to improvements in running characteristics, formation of the backcoat layers itself requires further coating and drying aside from formation of the magnetic layers, resulting in complicated manufacturing processes to directly affect the production cost. Adoption thereof are therefore limited to high-grade products.

On the other hand, recent magnetic recording media have increased in demands for enhanced manufacturing efficiency, and it has been strongly desired to improve coating processes.

For satisfying such demands, the following techniques in respect to the amount of the paint coated have been proposed.

That is to say, methods for producing a magnetic recording medium are proposed in which when two-layer coating is carried out on one side of a non-magnetic support, the amount of a coating solution coated in each layer is specified. Such methods include "a coating method of a magnetic recording medium comprising previously coating a running support with a first coating solution, and coating it with a second coating solution by pressing an extrusion nozzle of a coating head for the second coating solution onto a coated surface of said first coating solution without supporting a back side of said support, while said first coating solution is not dried yet, in which the amount of the first coating solution coated is 60 cc/m² or less, and the amount of the second coating solution coated is 50 cc/m² or less" (Japanese Examined Patent Publication No. 5-59491) and "a method for producing a magnetic recording medium comprising forming a plurality of magnetic layers on a running flexible support by sequential or simultaneous coating in multiple layers in a wet state, followed by drying and calendering, in which (a) at least an urethane resin is added to a binder for a paint of the lower magnetic layer and the amount thereof coated is controlled to 30 cm³/m² or less, and (b) a vinyl chloride resin and an urethane resin each containing a polar group are added to a binder for a paint of the uppermost layer, a mixture is kneaded at an actual load of a motor applied in kneading of at least 0.1 kW/kg of magnetic powder for 5 minutes to 2 hours, and the amount thereof coated is controlled to 25 cm³/m²" (Japanese Unexamined Patent Publication No. 3-120618).

Further, methods for producing a magnetic recording medium are proposed in which a coating solution for a magnetic layer and a coating solution for a backcoat layer are applied, and then, both the coating films are simultaneously dried, for reducing a coated sheet loss. Such methods include "a method for producing a magnetic recording medium having a magnetic layer formed on one side of a non-magnetic support and a backcoat layer formed on the other side of the non-magnetic support, which comprises the steps of coating one side of the non-magnetic support with a magnetic paint for formation of the magnetic layer, coating the other side of the non-magnetic support with a paint for formation of the backcoat layer, and applying a magnetic field thereto after application of said magnetic paint for formation of the magnetic layer and said paint for formation of the backcoat layer while the magnetic paint for formation of the magnetic layer is not dried yet to conduct magnetic field orientation treatment, wherein when the magnetic paint for formation of the magnetic layer and the paint for formation of the backcoat layer are applied, both the paints keep undried" (Japanese Unexamined Patent Publication No. 9-185822).

However, in the proposals described in Japanese Examined Patent Publication No. 5-59491 and Japanese Unexamined Patent Publication No. 3-120618 mentioned above, the amount of the paint coated on the backcoat layer side is not described, and it can not be said that measures in respect to the appearance of coated sheet rolls after winding are sufficient.

Further, in the proposal described in Japanese Unexamined Patent Publication No. 9-185822, the method for producing the magnetic recording medium is described in which both the coating films of the magnetic layer and the backcoat layer are simultaneously dried for reducing the production cost. However, the amounts coated for the magnetic layer and the backcoat layer are not specified, and no measures are taken with respect to the appearance of a coated sheet roll after winding.

SUMMARY OF THE INVENTION

It is therefore an object of the present invention to provide a method for producing a magnetic recording medium improved in the appearance of a coated sheet roll after winding and in the stability in qualities such as electromagnetic characteristics, magnetic characteristics and running durability.

As a result of intensive studies to solve the above-mentioned problem, the present inventors have discovered that the object can be attained by optimizing the amounts of the paint coated on the magnetic layer side and the backcoat layer side, thus completing the present invention.

That is to say, the present invention provides:

(1) a method for producing a magnetic recording medium comprising coating both sides of a non-magnetic support with paints for formation of coating films, followed by simultaneous drying of the respective coating films, in which the following four requirements are fulfilled, taking the amount of the paint coated on one side (a magnetic layer side) of the non-magnetic support as "W MAG" and the amount of the paint coated on the other side (a backcoat layer side) thereof as "W BC":

| | |
|---|---|
| 2.0 g/m² ≤ W MAG ≤ 40.0 g/m² | (1) |
| 2.5 g/m² ≤ W BC ≤ 25.0 g/m² | (2) |
| 3 W MAG ≥ −16 W BC+70 | (3) |
| 9 W MAG ≤ −10 W BC+385 | (4) |

(2) the method described in (1), in which when the amount of the paint coated on the magnetic layer side is small within the range of the amount of the paint coated described in (1), at least 30% by weight of an organic solvent with a high boiling point is contained in the whole organic solvent, and when the amount of the paint coated is large within the range of the amount of the paint coated described in (1), at least 30% by weight of an organic solvent with a low boiling point is contained in the whole organic solvent;

(3) the method described in (1), in which when the amount of the paint coated on the magnetic layer side is small within the range of the amount of the paint coated described in (1), the solid content is lower than 25% by weight, and conversely, when the amount of the paint coated is large within the range of the amount of the paint coated described in (1), the solid content is at least 30% by weight;

(4) the method described in (1), in which when the amount of the paint coated on the backcoat layer side is small within the range of the amount of the paint coated described in (1), at least 30% by weight of an organic solvent with a high boiling point is contained in the whole organic solvent, and when the amount of the paint coated is large within the range of the amount of the paint coated described in (1), at least 30% by weight of an organic solvent with a low boiling point is contained in the whole organic solvent;

(5) the method described in (1), in which when the amount of the paint coated on the backcoat layer side is small within the range of the amount of the paint coated described in (1), the solid content is lower than 12% by weight, and conversely, when the amount of the paint coated is large within the range of the amount of the paint coated described in (1), the solid content is at least 15% by weight; and (6) the method described in (1), in which the process of drying and calendering of the magnetic layer and the backcoat layer are continuously carried out in line.

DESCRIPTION OF THE PREFERRED EMBODIMENTS

Figure 1:
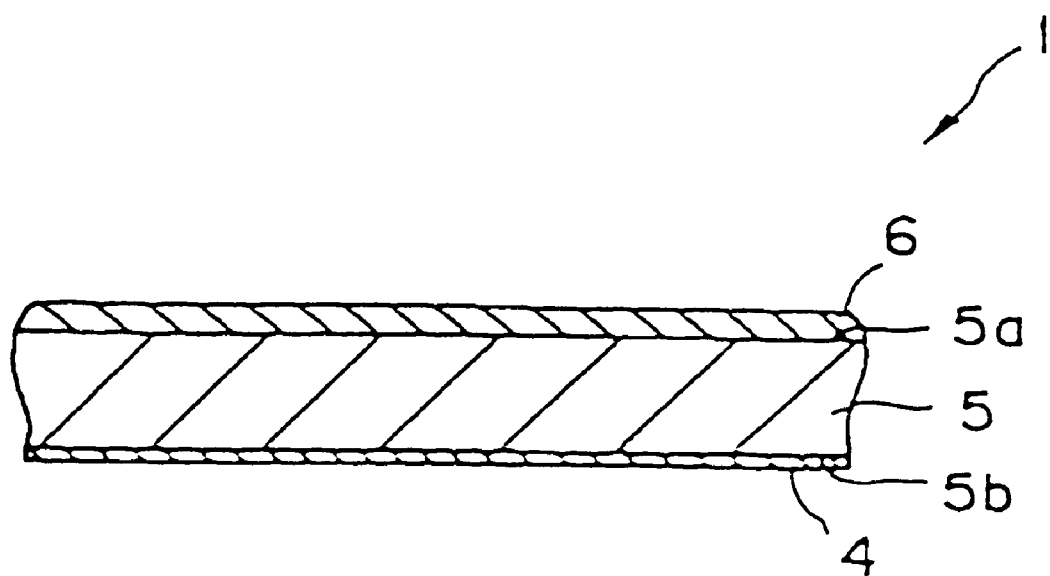
FIG. 1 is a cross sectional view schematically showing an example of a magnetic recording medium which is a subject of a producing method of the present invention.

Embodiments of the present invention are described below in detail. An example of a magnetic recording medium 1 which is a subject of the present invention is shown in FIG. 1. As shown in FIG. 1, the magnetic recording medium (1) has a magnetic layer (6) formed on one side (5a) of a non-magnetic support (5) and a backcoat layer (4) formed on the other side (5b) of the non-magnetic support (5). An example of a rough manufacturing process is shown in FIG. 2 for illustrating a method for producing such a magnetic recording medium (1).

Figure 2:
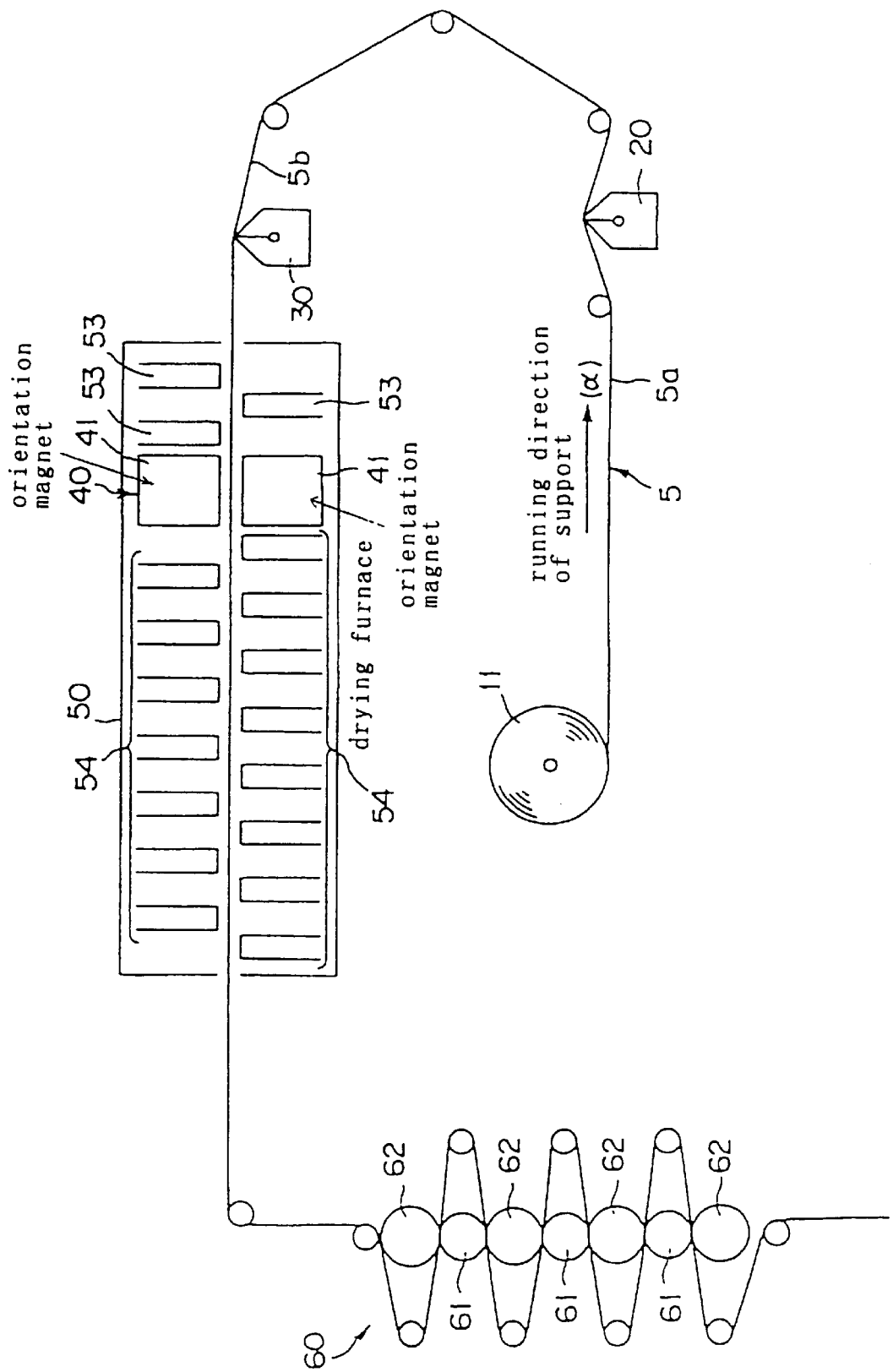
FIG. 2 is a process flow diagram schematically showing an example (until halfway) of a producing method of the present invention.

In FIG. 2, a feeding device having a feeding roll (11) on which a non-magnetic support (5) is wound is positioned most upstream. Downstream from the feeding roll (11), a device for applying a magnetic paint (for example, an extrusion nozzle (20)), a device for applying a paint for formation of a backcoat layer (for example, an extrusion nozzle (30)), a magnetic field orientation device (40), a drying device (50), a calendering device (60) and a winder (not shown) are arranged as main devices in this order.

Then, in the producing method of the present invention, the magnetic paint for formation of the magnetic layer is first applied onto the one side 5a of the non-magnetic support 5 which is continuously running (in the direction indicated by the arrow α) by use of the coating device (for example, the extrusion nozzle 20), as shown in FIG. 2.

In general, a surface of the non-magnetic support 5 is often treated by various means such as wet cleaning using water or a solvent, dry cleaning using non-woven fabric or --extra fine fiber woven fabric as a wiper and non-contact cleaning using compressed air, a vacuum or ionized air, for cleaning or adjusting the surface before application of the paint. Further, the surface of the non-magnetic support 5 is often treated by various known non-contact processes such as corona discharge, ultraviolet irradiation and electron beam irradiation, for improving the adhesion of the non-magnetic support 5 to the paint, or the coating surface. Furthermore, the surface of the non-magnetic support 5 is sometimes undercoated with an aqueous undercoat, an emulsion undercoat or a solvent undercoat, alone or in combination with the above-mentioned surface treatment, for improving the adhesion thereof.

After such application of the magnetic paint, various treatments for smoothing a wet film surface of the magnetic paint applied on the non-magnetic support or for a restriction of the coating film may be usually conducted as the subsequent step. As smoothing means, known methods such as a contact with a resin, metal or ceramic film or bar and non-contact methods such as application of a magnetic field with a permanent magnet or an electromagnet and ultrasonic vibration can be used. They can be used alone or in combination thereof depending on required characteristics.

Immediately after such application of the magnetic paint, the coating for formation of the backcoat layer is applied onto the other side 5b of the continuously running non-magnetic support 5 by use of the coating device (for example, the extrusion nozzle 30).

In the coating method shown in FIG. 2, it is most preferred that the magnetic paint and the paint for formation of the backcoat layer are simultaneously applied onto both sides and dried with the same drying means. In this case, the coating device positioned most upstream may be any of a gravure coater, a reverse roll coater and an extrusion nozzle. However, the downstream coating device is required to use an extrusion nozzle. Further, when both sides of the non-magnetic support are simultaneously coated (when the magnetic paint and the paint for formation of the backcoat layer are simultaneously applied onto both sides), both are required to use extrusion nozzles.

As to such a both side coating method, the present applicant has already proposed the best coating method (Japanese Unexamined Patent Publication Nos. 7-185449 and 7-185437).

Here, the amount of the paint coated on the magnetic layer side is preferably 2.0 to 40.0 g/m$^2$.

In this case, the magnetic layer may be formed either in the monolayer form or in the multiple layer form.

In the case of the multiple layer form, the sum of the amounts of the paints coated in the respective layers is preferably 2.0 to 40.0 g/m$^2$.

When the amount of the paint coated is less than 2.0 g/m$^2$, coating streaks occur to deteriorate the appearance of a coated sheet roll after winding. On the other hand, when the amount of the paint coated is more than 40.0 g/m², a wide variation in coating film thickness increases to deteriorate the appearance of the coated sheet roll after winding.

Although not specified, when the amount of the magnetic paint coated on the magnetic layer side is small within the above-mentioned range, at least 30% by weight of an organic solvent with a high boiling point (for example, cyclohexanone) is preferably contained in the whole organic solvent, and conversely, when the amount of the magnetic paint coated is large, at least 30% by weight of an organic solvent with a low boiling point (for example, methyl ethyl ketone) is preferably contained in the whole organic solvent. When the amount of the high boiling solvent is smaller in the case of a small amount of the magnetic paint coated, drying of the coating film is expedited to deteriorate smoothing in coating, resulting in deterioration of electromagnetic characteristics. When the amount of the low boiling solvent is smaller in the case of a large amount of the magnetic paint coated, the amount of the solvent remaining in the coating film increases to develop clogging in a running durability test.

Further, when the amount of the paint coated on the magnetic layer side is small within the above-mentioned range, the solid content (in the present invention, the term "solid content" means the amount ratio of nonvolatile components contained in the total materials) is preferably lower than 25% by weight, and conversely, when the amount of the paint coated is large within the above-mentioned range, the solid content is preferably at least 30% by weight. However, the amount of the paint coated is not particularly limited to this range. When the solid content is higher in the case of a small amount of the magnetic paint coated, the fluidity of the paint becomes poor to cause failure of uniform coating, leading to deterioration of the appearance of the coated sheet roll after winding. Further, when the solid content is lower in the case of a large amount of the magnetic paint coated, the amount of the solvent remaining in the coating film increases to develop clogging in a running durability test.

The amount of the paint coated on the backcoat layer side is preferably 2.5 to 25.0 g/m².

In this case, the backcoat layer may be formed either in the monolayer form or in the multiple layer form. In the case of the multiple layer form, the sum of the amounts of the paints coated in the respective layers is preferably 2.5 to 25.0 g/m². When the amount of the paint coated is less than 2.5 g/m², coating streaks occur to deteriorate the appearance of the coated sheet roll after winding. On the other hand, when the amount of the paint coated is more than 25.0 g/m², a variation in coating film thickness increases to deteriorate the appearance of the coated sheet roll after winding.

From the same reason as with the amount of the paint coated on the magnetic layer side, when the amount of the paint for formation of the backcoat layer coated is small within the above-mentioned range, at least 30% by weight of an organic solvent with a high boiling point (for example, cyclohexanone) is preferably contained in the whole organic solvent, and conversely, when the amount of the paint coated is large, at least 30% by weight of an organic solvent with a low boiling point (for example, methyl ethyl ketone) is preferably contained in the whole organic solvent, although not specified. Further, when the amount of the paint coated is small, the solid content is preferably lower than 12% by weight, and conversely, when the amount of the paint coated is large, the solid content is preferably at least 15% by weight. However, the amount of the paint coated is not particularly limited to this range.

It is necessary to fulfill both of (1) 2.0 g/m² ≦ W HAG ≦ 40.0 g/m² and (2) 2.5 g/m² ≦ W BC ≦ 25.0 g/m², taking the amount of the paint coated on the magnetic layer side as "W MAG" and the amount of the paint coated on the backcoat layer side as "W BC".

Further, it is also necessary to fulfill both of (3) 3 W MAG ≧ −16 W BC+70 and (4) 9 W MAG ≦ −10 W BC+385. When 3 W MAG ≧ −16 W BC+70 is not fulfilled, drying of the coating film is expedited to deteriorate the electromagnetic characteristics. On the other hand, when 9 W MAG ≦ −10 W BC+385 is not fulfilled, the amount of the solvent remaining in the coating film increases to develop clogging in the running durability test.

After both sides of the non-magnetic support (5) are thus coated with the magnetic paint for formation of the magnetic layer and the paint for formation of the backcoat layer, respectively, and while the magnetic paint for formation of the magnetic layer is not dried yet, the magnetic field is applied with orientation magnets (41) and (41) of the magnetic field orientation device to conduct the magnetic field orientation treatment (magnetic field orientation treatment step).

The magnetic field orientation treatment may conducted with the orientation magnets (41) and (41) after the coating film is preliminarily dried with a hot air blowout nozzle (53) prior to the orientation magnets (41) and (41) in a drying furnace, as shown in FIG. 2. The reference numeral (54) designates a plurality of hot air blowout nozzles arranged downstream from the orientation magnets (41) and (41). The orientation magnets may be arranged in multiple stages in the drying furnace, without being restricted to the pair of orientation magnets as shown in FIG. 2. Further, front orientation magnets (not shown in FIG. 2) may be disposed between the extrusion nozzle (20) and an entrance to the drying furnace, and post-orientation magnets may be further arranged in the drying furnace.

Further describing the magnetic field orientation treatment, which is carried out for orientating a magnetic powder in the magnetic layer, the magnetic powder may be orientated longitudinally, perpendicularly or obliquely to the running direction of the medium. Furthermore, for directing the magnetic powder to the specified direction, magnetic field generating means such as permanent magnets such as ferrite magnets and rare earth magnets, electromagnets and solenoids are used. These magnetic field generating means may be used in combination. Further, an appropriate drying step may be preliminarily provided before orientation, or drying step may be performed simultaneously with orientation step, so as to give the highest orientation after drying.

After such magnetic field orientation treatment, each coating film is dried in the drying device (50) (drying furnace). In the case of the drying device (50) shown in FIG. 2, the coating film is dried with hot air blowing out from the hot air blowout nozzles (53) and (54). However, the coating film may be dried and fixed with known drying and evaporating means such as far infrared radiation, electric heaters and vacuum devices, or with known hardening devices such as ultraviolet lamps and radiation irradiation devices. The drying temperature may be appropriately selected from the range of room temperature to about 300° C., depending on the heat resistance of the non-magnetic support, and the solvent used and concentration of the paint. Further, the temperature gradient may be formed in the drying furnace, and the gas atmosphere in the drying furnace may be usual air or an inert gas. When the resin is hardenable by radiation (electron beams or ultraviolet rays), drying with an ultraviolet lamp or a radiation irradiation device induces the hardening reaction. Accordingly, when consideration is given to the after treatment, it is preferred that as other drying means as possible are used. Irradiation by ultraviolet rays or radiation, with a solvents contained, is sometimes followed by firing or smoking. It is therefore also preferred that as other drying means as possible are used in combination.

The coating films (magnetic layer and backcoat layer) thus subjected to the magnetic field orientation treatment and the drying treatment are calendered with the subsequent calendering device (60). In this embodiment, the calendering is continuously carried out in line. However, needless to say, off-line operation is also possible. The calendering in line with the magnetic layer and the backcoat layer provided significantly improves the surface processability of the magnetic layer and improves characteristics such as electromagnetic characteristics. Further, the continuous treatment in line can reduce the loss of the coated sheet which has been caused by separation of the coating line from the calendering line.

The calendering device (60) for performing the calendering is provided with a plurality of calender rolls (61) and (62) aligned, and the non-magnetic support on which the magnetic layer and the backcoat layer are formed passes between the calender rolls while being heated and pressurized, as shown in FIG. 2. The calender rolls (61) shown in FIG. 2 are rolls disposed so as to be in contact with the magnetic surface, and the calender rolls (62) are rolls disposed so as to be in contact with the back side (the side on which the backcoat layer is formed) of the non-magnetic support. The calender rolls (61) disposed so as to be in contact with the magnetic surface are usually metal rolls, and the calender rolls (62) disposed so as to be in contact with the back side of the non-magnetic support may be either resin rolls or metal rolls. As the resin rolls, rolls formed of heat-resistant plastics such as epoxy resins, polyesters, nylon, polyimides and polyamideimides (in which carbon, metals or other inorganic compounds may be kneaded) are used. These calender rolls (61) and (62) are usually used as a combination of about 3 to about 7 rolls (FIG. 2 discloses a combination of 7 rolls). The treating temperature thereof is preferably 70° C. or more, and more preferably 80° C. or more. Although the upper limit thereof varies according to the support, it is preferably 150° C. or less. Further, the line pressure between the rolls is preferably 200 kg/cm or more, and more preferably 300 kg/cm or more. Although the speed thereof depends on the speed of the coater because of the in-line operation, it is usually within the range of 20 m/minute to 700 m/minute.

After such calendering treatment, thermosetting treatment at 40 to 80° C. and/or electron beam irradiation treatment is preferably conducted for accelerating the hardening of the magnetic layer and the backcoat layer. Then, the coated sheet is processed with a slitter into a specified tape form, and secondary treatments such as polishing and cleaning are performed on the magnetic surface and/or the backcoat surface to prepare a magnetic recording medium.

The magnetic paint for formation of the magnetic layer and the paint for formation of the backcoat layer used in the present invention are described below.

The magnetic paint contains a ferromagnetic powder, a binder and a solvent as main components.

Examples of the ferromagnetic powders used include magnetic powders of the iron oxide family such as $\gamma$-$Fe_2O_3$ coated or doped with a Co compound, $Fe_3O_4$ coated or doped with a Co compound and berthollide coated or doped with a Co compound; ferromagnetic iron or alloy powders mainly containing ferromagnetic metal elements such as $\alpha$-Fe, Fe-Co, Fe-Ni, Fe-Co-Ni, Co and Co-Ni; magnetic $CrO_2$ powder; and plate hexagonal ferrite powder having an axis of easy magnetization perpendicular to a plate.

Addition of Al, Si, P, Y and rare earth elements to the above-mentioned ferromagnetic powders can prevent the ferromagnetic powders from being sintered to improve the particle size distribution. As a result, the electromagnetic characteristics of the magnetic recording media can be improved. Further, when surfaces of the ferromagnetic powders are covered with Al, Si, P or oxides thereof in producing the ferromagnetic powders, or when the ferromagnetic powders are surface treated with coupling agents such as Si, Al and Ti, or various surfactants after production of the ferromagnetic powders, the dispersibility of the ferromagnetic powders in the magnetic paints and the durability of the magnetic recording media in which the ferromagnetic powders are used can be improved thereby.

The binder contained in the magnetic paint can be any binder resin of a thermoplastic resin, a reactive resin and an electron beam-hardenable resin which are generally used for formation of the magnetic layer of the magnetic recording medium. The thermoplastic resin is preferably a resin having a softening point of 150° C. or less and an average molecular weight of 5,000 to 200,000. Examples thereof include vinyl chloride copolymers, polyurethane resins, (meth)acrylic resins, polyester resins, nitrocellulose and phenoxy resins. Copolymers having hydroxyl groups at terminus and/or side chains thereof are suitable among others, because electron beam crosslinking can be easily utilized after crosslinking using isocyanates as reactive resins or electron beam reactive modification. The average molecular weight and the polymerization degree thereof are similar to those of the base thermoplastic resins, and the molecular weight is infinitely increased by the reaction such as condensation or addition by coating, drying, heating and/or electron beam irradiation after calendering.

Hydrophilic functional groups, for example, at least one polar group selected from —$SO_3M$, —$SO_4M$, =$PO_3M$, =$PO_2M$, =POM, —P=$O(OM)_2$, —OP=$O(OM)_2$, —COOM, —$NR_3X$, —$NR_2$, —$N^+R_3$, an epoxy group, —OH, —SH and —CR (wherein M represents H, Li, Na, K or —$NR_3$, R represents an alkyl group or H, and X represents a halogen atom), are preferably introduced into such binder resins by copolymerization or addition reaction. Addition of these polar groups can improve the dispersibility of pigments including the ferromagnetic powders, carbons, abrasives and etc. in the magnetic paints. As a result, the characteristics of the magnetic recording media can be improved. These polar groups may exist either in main chains of skeleton resins or in branched chains.

These resins can be used alone, but the use thereof as a combination of; two or more of them can improve various characteristics of the magnetic recording media in which they are used. In particular, a preferred embodiment is a combination of the vinyl chloride copolymer and the polyurethane resin.

The vinyl chloride content of the vinyl chloride copolymer is preferably 60 to 95% by weight, and more preferably 60 to 90% by weight. The average molecular weight thereof is preferably about 100 to about 500. Such vinyl chloride copolymers are obtained by copolymerizing copolymerizable monomers such as vinyl chloride, vinyl acetate, vinyl alcohol introduced by saponification of vinyl acetate, hydroxyalkyl (meth)acrylate, maleic acid, glycidyl (meth) acrylate and allyl glycidyl ether. At least one selected from the above-mentioned polar groups is preferably introduced into these copolymers by copolymerization or addition reaction. In particular, an —$N^{3O}R_3$ group is preferred because it can improve the characteristics (such as shelf-stability) of the paints by the use in combination with the above-mentioned acid-derived polar groups.

The term "polyurethane resin" is the general term for resins obtained by the reaction of hydroxyl group-containing resins such as polyesterpolyols and/or polyetherpolyols with polyisocyanate-containing compounds, and such raw materials for synthesis are polymerized to a number average molecular weight of about 5,000 to about 200,000. The Q value (weight average molecular weight/number average molecular weight) thereof is required to be about 1.5 to about 4. It is preferred that at least two kinds of these polyurethane resins different in glass transition temperature Tg within the range of $-30°$ C.$\leq$Tg$\leq 80°$ C. are contained in the binder used, and that the total amount thereof is 10 to 90% by weight of the whole binder. Addition of these plural polyurethane resins gives a balance between the running stability of the medium under high-temperature circumstances and the calendering processability and electromagnetic characteristics. It is further preferred that the above-mentioned polar groups are introduced into such polyurethane resins (at least one when two or more kinds of them are used).

Further, the above-mentioned vinyl chloride copolymer and polyurethane resin are preferably used at a mixing weight ratio of 10:90 to 90:10. As crosslinking agents for hardening the binder resins, various isocyanates can be used. Hydroxyl groups contained in the binder resins are three-dimensionally linked together with the crosslinking agents. As a result, the durability of the coating film layers can be improved. Further, it is also possible to use crosslinking agents in which (meth)acrylic double bonds are introduced into the above-mentioned copolymers by known techniques to conduct electron beam reactive modification.

Although there is no particular limitation on the solvent used in the magnetic paint, it is chosen depending on the solubility, compatibility and drying efficiency thereof. Examples of the solvents include ketones such as methyl ethyl ketone, methyl isobutyl ketone and cyclohexanone; aromatic hydrocarbons such as toluene and xylene; esters such as ethyl acetate and butyl acetate; alcohols such as isopropanol and butanol; and solvents or diluents such as dioxane, tetrahydrofuran, dimethylformamide, hexane and chlorine-substituted hydrocarbons. They are used either alone or as a mixed solvent at an arbitrary ratio.

The magnetic paints usually contain lubricants. Of various known lubricants, fatty acids and/or fatty acid esters are particularly preferably used. The fatty acids include monobasic fatty acids each having 12 to 24 carbon atoms. The fatty acid esters include fatty acid monoesters, fatty acid diesters and fatty acid triesters of monobasic fatty acids each having 10 to 24 carbon atoms and any one of monohydric to hexahydric alcohols each having 2 to 22 carbon atoms and cyclic or polysaccharide-reduced alcohols. Hydrocarbon groups of these fatty acid and fatty acid esters may contain unsaturated bonds and may be branched. They may be used as a combination of two or more of them. It is preferred that the lubricants are added to the backcoat layers and the undercoat layers, as well as the magnetic layers. In particular, when the magnetic layers are thin, addition thereof to the undercoat layers can effectively improve the still durability. Further, when the lubricants are added in large amounts to the backcoat layer side, the surface lubricity can be improved by transference thereof to surfaces of the magnetic layers.

Usually, additives for giving a lubricating effect, an antistatic effect, a dispersing effect and a plasticizing effect are contained in the magnetic paints. As such additives, silicone oils, fluorine oils, cationic surfactants, nonionic surfactants, anionic surfactants and amphoteric surfactants can be used.

Further, inorganic compounds, particularly abrasives and non-ferromagnetic pigments, are contained in the magnetic paints. The pigments which can be used include α-alumina, γ-alumina, θ-alumina, dichromium trioxide, α-iron oxide, $SiO_2$, ZnO, $TiO_2$, silicon carbide, calcium carbonate and barium sulfate. Although the particle shape and size of these pigments may be arbitrarily chosen, the particle shape is preferably spherical or polyhedral. The particle size is preferably 0.01 to 0.7 μm, and may be appropriately chosen depending on a balance between the durability required for the media and head-abrasion, and an output at the shortest recording wavelength, as needed. The pigments may be used alone or in combination.

Furthermore, carbon black may be contained in the magnetic paints. As carbon black, furnace carbon black, thermal carbon black and acetylene carbon black can be used. They may be used either alone or in combination. They may be surface treated with lubricants or dispersing agents, or surfaces thereof may be partially graphitized. Although the particle size thereof may be arbitrarily chosen, it may be appropriately chosen depending on a balance (surface roughness) between the electric resistance and frictional characteristics required for the media, and an output at the shortest recording wavelength.

Further, non-magnetic organic powders (organic pigments) may be contained in the magnetic paints. The non-magnetic organic powders used include acrylic styrenic resin powders, benzoguanamine resin powders, melamine resin powders, phthalocyanine pigments, polyolefin resin powders, polyester resin powders, polyamide resin powders, polyimide resin powders, hydrocarbon fluoride resin powders and divinylbenzene resin powders.

As the non-magnetic supports coated with such magnetic paints, films formed of polyethylene terephthalate (PET), polyethylene naphthalate (PEN), polyamides, polyimides and polyamideimides can be used. Of these, the films of PET, PEN and aromatic polyamides are preferred, and composite films formed by multi-layer co-extrusion of two or three kinds of resins including PET and PEN are more preferred. Furthermore, the non-magnetic supports may be previously subjected to corona discharge treatment, plasma discharge and/or polymerization treatment, coating treatment of adhesion improving agents, dustproof treatment, relaxation treatment by heat and/or humidification.

The thickness of the non-magnetic support is desirably less than 20 μm. When the non-magnetic support having a thickness of 20 μm or more is used, the appearance of the coated sheet roll after winding is good and the effect of the present invention can not be achieved by specifying the amount of the paint coated.

In the present invention, the non-magnetic support is coated with the paint for formation of the backcoat layer (4) on the surface opposite to the side coated with the magnetic paint. The paint for formation of the backcoat layer mainly contains carbon black or an inorganic compound, a binder and a solvent. These are appropriately selected for conforming the required characteristics from the carbon black or the inorganic compounds, the binders and the solvents illustrated in the description with respect to the above-mentioned magnetic paints and used. Further, a lubricant and an additive(s) can be appropriately selected from the lubricants and the various additives illustrated in the description with respect to the above-mentioned magnetic paints, and also contained in the paint.

Processes for manufacturing the magnetic paints used in the production of the magnetic recording media of the present invention and the paints for formation of the magnetic recording media (the paints for formation of the backcoat layers) each comprise at least (1) kneading step, (2) dispersing step and (3) filtering step, and given before and after these steps as needed, (4) mixing step and (5) storing step. In the kneading step, a device having strong kneading ability such as a continuous kneader, a pressure kneader, a high-speed mixer and a two-roll mill is used, and all or a part of the pigment powders and the binders are kneaded.

Further, in dispersion of the paints, zirconia or glass beads are used. In the dispersing step, dilution dispersion is used in combination so that the solid concentration is gradually decreased. The individual step may be each divided into two or more stages, and raw materials may be added separately at two or more stages.

The filtering steps of the paints are preferably provided after the respective production steps. If undispersed or coagulated materials such as magnetic powders and pigments, or undissolved resins exist in the magnetic paints, they become defects in the magnetic paints, which causes increases in dropout and in error rate. A main object of the filtering steps is to remove these contaminants in the magnetic paints.

The present invention will be described in more detail with reference to the following examples.

A magnetic paint for formation of a magnetic layer and a paint for formation of a backcoat layer were each prepared in the following manner.

Preparation of Magnetic Paint for Formation of Magnetic Layer
[Preparation of Binder Solution]

| | |
|---|---|
| Vinyl chloride resin (MR-110 manufactured by Nippon Zeon Co., Ltd.) | 10 parts by weight |
| Polyesterpolyurethane resin (containing —SO₃Na groups, Mn: 25000, Tg: 20° C.) | 5 parts by weight |
| Polyesterpolyurethane resin (containing —SO₃Na groups, Mn: 25000, Tg: −25° C.) | 2 parts by weight |
| Methyl ethyl ketone (MEK) | 21 parts by weight |
| Toluene | 21 parts by weight |
| Cyclohexanone | 21 parts by weight |

The above-mentioned composition was placed in an agitator, and mixed by stirring for 6 hours to form a binder solution. The above-mentioned binder solution was filtered in circulation through a Depth type filter having a 95% cut filtration accuracy of 5.0 μm for 8 hours to prepare a binder solution.
[Kneading-Dispersing Treatment]

| | |
|---|---|
| α-Fe magnetic powder (Hc: 1650 Oe, δs: 126 emu/g, specific surface area: 60 m²/g, length in the long axis: 0.1 μm) | 100 parts by weight |
| α-Al₂O₃ (HIT-80 manufactured by Sumitomo Chemical Co, Ltd.) | 10 parts by weight |
| Binder solution | 40 parts by weight |

The above-mentioned composition was placed in a pressure kneader, and kneaded for 2 hours. After kneading, the following composition was added thereto to adjust the viscosity to the optimum for dispersing treatment.

| | |
|---|---|
| Binder solution | 40 parts by weight |
| MEK | 15 parts by weight |
| Toluene | 15 parts by weight |
| Cyclohexanone | 15 parts by weight |

After mixing, they were dispersed in a sand grinder mill.
[Viscosity Adjusting Step]

| | |
|---|---|
| Stearic acid | 0.5 part by weight |
| Myristic acid | 0.5 part by weight |
| Butyl stearate | 0.5 part by weight |
| MEK | 65 parts by weight |
| Toluene | 65 parts by weight |
| Cyclohexanone | 65 parts by weight |

The above-mentioned composition was placed in an agitator, and mixed by stirring for 1 hour to prepare a viscosity adjusting solution. The above-mentioned viscosity adjusting solution was filtered in circulation through a Depth type filter having a 95% cut filtration accuracy of 1.2 μm for 8 hours.

After mixing of the viscosity adjusting solution filtered in circulation with the slurry dispersed, they were dispersed in a sand grinder mill to adjust the viscosity.
[Final Paint Step]

To 100 parts by weight of the paint after filtration, 0.8 part by weight of an isocyanate compound (Coronate L manufactured by Nippon Polyurethane Co., Ltd.) was added, and mixed by stirring to prepare a paint for a magnetic layer.
Preparation of Paint for Formation of Backcoat Layer
[Preparation of Binder Solution]

| | |
|---|---|
| Vinyl chloride copolymer (vinyl chloride-vinyl acetate-vinyl alcohol-N,N-dimethylethanolamine-modified vinyl unit-maleic acid copolymer, monomer weight ratio: 91:3:5:0.5:0.5 by weight, average degree of polymerization: 400) | 35 parts by weight |
| Polyesterpolyurethane resin (containing —SO₃Na groups, Mn: 40000, Tg: 20° C.) | 35 parts by weight |
| MEK | 100 parts by weight |
| Toluene | 80 parts by weight |
| Cyclohexanone | 100 parts by weight |

The above-mentioned composition was placed in an agitator, and mixed by stirring for 6 hours to prepare a binder solution. The above-mentioned binder solution was filtered in circulation through a Depth type filter having a 95% cut filtration accuracy of 5.0 μm for 8 hours to prepare a binder solution.
[Kneading-Dispersing Treatment]

| | |
|---|---|
| Carbon black (#47B manufactured by Mitsubishi Chemical Corporation) | 100 parts by weight |
| Carbon black (MT-CI manufactured by Colombian Carbon Co.) | 1 part by weight |
| α-Fe₂O₃ (length in the long axis: 0.10 μm, axis ratio: 8) | 1 part by weight |
| Binder solution | 130 parts by weight |

The above-mentioned composition was placed in a pressure kneader, and kneaded for 2 hours. After kneading, the following composition was added thereto to adjust the viscosity to the optimum for dispersing treatment.

| Binder solution | 45 parts by weight |
|---|---|
| MEK | 70 parts by weight |
| Toluene | 55 parts by weight |
| Cyclohexanone | 70 parts by weight |

After mixing, they were dispersed in a sand grinder mill.
[Viscosity Adjusting Step]

| Binder solution | 175 parts by weight |
|---|---|
| Stearic acid | 1 part by weight |
| Myristic acid | 1 part by weight |
| Butyl stearate | 1 part by weight |
| MEK | 200 parts by weight |
| Toluene | 250 parts by weight |
| Cyclohexanone | 200 parts by weight |

The above-mentioned composition was placed in an agitator, and mixed by stirring for 1 hour to prepare a viscosity adjusting solution. The above-mentioned viscosity adjusting solution was filtered in circulation through a Depth type filter having a 95% cut filtration accuracy of 1.2 µm for 8 hours.

After mixing of the viscosity adjusting solution filtered in circulation with the slurry dispersed, dispersing treatment was carried out in a sand grinder mill to adjust the viscosity, thereby preparing a paint for formation of a backcoat layer. This paint was filtered in circulation through a Depth type filter having a 95% cut filtration accuracy of 1.2 µm for 8 hours.
[Final Paint Step]

To 100 parts by weight of the paint after filtration, 1.0 part by weight of an isocyanate compound ((Coronate L manufactured by Nippon Polyurethane Co., Ltd.) was added, and mixed by stirring to prepare a final paint for formation of a backcoat layer.

After preparation of such paints, coating experiments were made using the respective paints in the following manner (examples and comparative examples).
Preparation of Magnetic Recording Medium Sample As shown in FIG. 2, corona discharge treatment was conducted on a magnetic layer formation side of a 8.3-µm thick polyethylene terephthalate (PET) support continuously running at a speed of 250 m/minute, and then, the above-mentioned magnetic paint for formation of a magnetic layer was applied onto the corona-treated side with the extrusion nozzle (20). While the coating film for formation of the magnetic layer was in a wet state, the paint for formation of a backcoat layer was applied onto the other side of the support with the extrusion nozzle (30). Thus, the respective coating films were continuously formed (the coating width of each film was 1 m). Then, after the magnetic layer and the backcoat layer were preliminarily dried with the hot air blowout nozzle 53, they were passed between the orientation magnets (41) and (41) while the magnetic layer was not dried yet, thereby drying the respective coating films while orientating a magnetic powder in the running direction (applying an orientation magnetic field of 7000 G in the running direction of a magnetic recording medium) to form the magnetic layer and the backcoat layer. After surfaces of both layers were calendered (temperature: 110° C., line pressure: 300 kg/cm), the sheet was once wound and allowed to stand at room temperature for 1 day, followed by thermosetting treatment at 60° C. for 24 hours. Then, the sheet was slit to a width of 8 mm to prepare a magnetic recording medium.

EXAMPLE 1

The magnetic paint for formation of the magnetic layer prepared as described above was applied onto one side (magnetic layer side) of a non-magnetic support so as to give an amount of the paint coated (W MAG) of 15.0 g/m$^2$, and the paint for formation of the backcoat layer was applied onto the other side (backcoat layer side) so as to give an amount of the paint coated (W BC) of 12.0 g/m$^2$ to prepare a magnetic recording medium sample of Example 1.

As to the magnetic paint for formation of the magnetic layer, the amount of organic solvent was adjusted so that the solid content became 25.0% by weight, a solvent with a high boiling point (cyclohexanone) was contained in an amount of 30% by weight based on the whole organic solvent, and a solvent with a low boiling point (methyl ethyl ketone) was contained in an amount of 30% by weight based on the whole organic solvent. On the other hand, for the coating for formation of the backcoat layer, the amount of organic solvent was adjusted so that the solid content became 12.0% by weight, a solvent with a high boiling point (cyclohexanone) was contained in an amount of 30% by weight based on the whole organic solvent, and a solvent with a low boiling point (methyl ethyl ketone) was contained in an amount of 30% by weight based on the whole organic solvent.

EXAMPLE 2

A sample of Example 2 was prepared in the same manner as with Example 1 with the exception that the magnetic paint for formation of the magnetic layer was applied so as to give an amount of the paint coated (W MAG) of 15.0 g/m$^2$, and the paint for formation of the backcoat layer was applied so as to give an amount of the paint coated (W BC) of 2.5 g/m$^2$.

EXAMPLE 3

A sample of Example 3 was prepared in the same manner as with Example 1 with the exception that the magnetic paint for formation of the magnetic layer was applied so as to give an amount of the paint coated (W MAG) of 15.0 g/m$^2$, and the paint for formation of the backcoat layer was applied so as to give an amount of the paint coated (W BC) of 3.5 g/m$^2$.

EXAMPLE 4

A sample of Example 4 was prepared in the same manner as with Example 1 with the exception that the magnetic paint for formation of the magnetic layer was applied so as to give an amount of the paint coated (W MAG) of 15.0 g/m$^2$, and the paint for formation of the backcoat layer was applied so as to give an amount of the paint coated (W BC) of 23.0 g/m$^2$.

EXAMPLE 5

A sample of Example 5 was prepared in the same manner as with Example 1 with the exception that the magnetic paint for formation of the magnetic layer was applied so as to give an amount of the paint coated (W MAG) of 15.0 g/m$^2$, and the paint for formation of the backcoat layer was applied so as to give an amount of the paint coated (W BC) of 25.0 g/M$^2$.

EXAMPLE 6

A sample of Example 6 was prepared in the same manner as with Example 1 with the exception that the magnetic paint for formation of the magnetic layer was applied so as to give an amount of the paint coated (W MAG) of 10.0 g/m², and the paint for formation of the backcoat layer was applied so as to give an amount of the paint coated (W BC) of 2.5 g/m².

EXAMPLE 7

A sample of Example 7 was prepared in the same manner as with Example 1 with the exception that the magnetic paint for formation of the magnetic layer was applied so as to give an amount of the paint coated (W MAG) of 10.0 g/m², and the paint for formation of the backcoat layer was applied so as to give an amount of the paint coated (W BC) of 3.5 g/m².

EXAMPLE 8

A sample of Example 8 was prepared in the same manner as with Example 1 with the exception that the magnetic paint for formation of the magnetic layer was applied so as to give an amount of the paint coated (W MAG) of 6.0 g/m², and the paint for formation of the backcoat layer was applied so as to give an amount of the paint coated (W BC) of 3.5 g/m².

EXAMPLE 9

A sample of Example 9 was prepared in the same manner as with Example 1 with the exception that the magnetic paint for formation of the magnetic layer was applied so as to give an amount of the paint coated (W MAG) of 6.0 g/m², and the paint for formation of the backcoat layer was applied so as to give an amount of the paint coated (W BC) of 4.5 g/m².

EXAMPLE 10

A sample of Example 10 was prepared in the same manner as with Example 1 with the exception that the magnetic paint for formation of the magnetic layer was applied so as to give an amount of the paint coated (W MAG) of 3.0 g/m², and the paint for formation of the backcoat layer was applied so as to give an amount of the paint coated (W BC) of 5.0 g/m².

EXAMPLE 11

A sample of Example 11 was prepared in the same manner as with Example 1 with the exception that the magnetic paint for formation of the magnetic layer was applied so as to give an amount of the paint coated (W MAG) of 3.0 g/m², and the paint for formation of the backcoat layer was applied so as to give an amount of the paint coated (W BC) of 12.0 g/m².

EXAMPLE 12

A sample of Example 12 was prepared in the same manner as with Example 1 with the exception that the magnetic paint for formation of the magnetic layer was applied so as to give an amount of the paint coated (W MAG) of 3.0 g/m², and the paint for formation of the backcoat layer was applied so as to give an amount of the paint coated (W BC) of 23.0 g/m².

EXAMPLE 13

A sample of Example 13 was prepared in the same manner as with Example 1 with the exception that the magnetic paint for formation of the magnetic layer was applied so as to give an amount of the paint coated (W MAG) of 2.0 g/m², and the paint for formation of the backcoat layer was applied so as to give an amount of the paint coated (W BC) of 4.0 g/m².

EXAMPLE 14

A sample of Example 14 was prepared in the same manner as with Example 1 with the exception that the magnetic paint for formation of the magnetic layer was applied so as to give an amount of the paint coated (W MAG) of 2.0 g/m², and the paint for formation of the backcoat layer was applied so as to give an amount of the paint coated (W BC) of 12.0 g/m².

EXAMPLE 15

A sample of Example 15 was prepared in the same manner as with Example 1 with the exception that the magnetic paint for formation of the magnetic layer was applied so as to give an amount of the paint coated (W MAG) of 2.0 g/m², and the paint for formation of the backcoat layer was applied so as to give an amount of the paint coated (W BC) of 25.0 g/m².

EXAMPLE 16

A sample of Example 16 was prepared in the same manner as with Example 1 with the exception that the magnetic paint for formation of the magnetic layer was applied so as to give an amount of the paint coated (W MAG) of 27.0 g/m², and the paint for formation of the backcoat layer was applied so as to give an amount of the paint coated (W BC) of 12.0 g/m².

EXAMPLE 17

A sample of Example 17 was prepared in the same manner as with Example 1 with the exception that the magnetic paint for formation of the magnetic layer was applied so as to give an amount of the paint coated (w MAG) of 29.0 g/m², and the paint for formation of the backcoat layer was applied so as to give an amount of the paint coated (W BC) of 12.0 g/m².

EXAMPLE 18

A sample of Example 18 was prepared in the same manner as with Example 1 with the exception that the magnetic paint for formation of the magnetic layer was applied so as to give an amount of the paint coated (W MAG) of 37.0 g/m², and the paint for formation of the backcoat layer was applied so as to give an amount of the paint coated (W BC) of 3.5 g/m².

EXAMPLE 19

A sample of Example 19 was prepared in the same manner as with Example 1 with the exception that the magnetic paint for formation of the magnetic layer was applied so as to give an amount of the paint coated (W MAG) of 40.0 g/m², and the paint for formation of the backcoat layer was applied so as to give an amount of the paint coated (W BC) of 2.5 g/m².

EXAMPLE 20

A sample of Example 20 was prepared in the same manner as with Example 1 with the exception that the magnetic paint for formation of the magnetic layer was applied so as to give an amount of the paint coated (W MAG) of 15.0 g/m², the paint for formation of the backcoat layer was applied so as to give an amount of the paint coated (W BC) of 2.5 gm² and the amount of organic solvent used in the paint for formation of the backcoat layer was adjusted so as to give a solid content of 11.0% by weight.

EXAMPLE 21

A sample of Example 21 was prepared in the same manner as with Example 1 with the exception that the magnetic paint for formation of the magnetic layer was applied so as to give an amount of the paint coated (W MAG) of 15.0 g/m², the paint for formation of the backcoat layer was applied so as to give an amount of the paint coated (W BC) of 2.5 g/m², and the amount of organic solvent used in the paint for formation of the backcoat layer was adjusted so that a solvent with a high boiling point (cyclohexanone) was contained in an amount of 35% by weight based on the whole organic solvent, and a solvent with a low boiling point (methyl ethyl ketone) was contained in an amount of 25% by weight based on the whole organic solvent.

EXAMPLE 22

A sample of Example 22 was prepared in the same manner as with Example 1 with the exception that the magnetic paint for formation of the magnetic layer was applied so as to give an amount of the paint coated (W MAG) of 15.0 g/m², the paint for formation of the backcoat layer was applied so as to give an amount of the paint coated (W BC) of 25.0 g/m², and the amount of organic solvent used in the paint for formation of the backcoat layer was adjusted so as to give a solid content of 15.0% by weight.

EXAMPLE 23

A sample of Example 23 was prepared in the same manner as with Example 1 with the exception that the magnetic paint for formation of the magnetic layer was applied so as to give an amount of the paint coated (W MAG) of 15.0 g/m², the paint for formation of the backcoat layer was applied so as to give an amount of the paint coated (W BC) of 25.0 g/m², and the amount of organic solvent used in the paint for formation of the backcoat layer was adjusted so that a solvent with a high boiling point (cyclohexanone) was contained in an amount of 25% by weight based on the whole organic solvent, and a solvent with a low boiling point (methyl ethyl ketone) was contained in an amount of 35% by weight based on the whole organic solvent.

EXAMPLE 24

A sample of Example 24 was prepared in the same manner as with Example 1 with the exception that the magnetic paint for formation of the magnetic layer was applied so as to give an amount of the paint coated (W MAG) of 2.0 g/m², the paint for formation of the backcoat layer was applied so as to give an amount of the paint coated (W BC) of 12.0 g/m², and the amount of organic solvent used in the magnetic paint for formation of the magnetic layer was adjusted so as to give a solid content of 24.0% by weight.

EXAMPLE 25

A sample of Example 25 was prepared in the same manner as with Example 1 with the exception that the magnetic paint for formation of the magnetic layer was applied so as to give an amount of the paint coated (W MAG) of 2.0 g/m², the paint for formation of the backcoat layer was applied so as to give an amount of the paint coated (W BC) of 12.0 g/m², and the amount of organic solvent used in the magnetic paint for formation of the magnetic layer was adjusted so that a solvent with a high boiling point (cyclohexanone) was contained in an amount of 35% by weight based on the whole organic solvent, and a solvent with a low boiling point (methyl ethyl ketone) was contained in an amount of 25% by weight based on the whole organic solvent.

COMPARATIVE EXAMPLE 1

A sample of Comparative Example 1 was prepared in the same manner as with Example 1 with the exception that the magnetic paint for formation of the magnetic layer was applied so as to give an amount of the paint coated (W MAG) of 1.5 g/m², and the paint for formation of the backcoat layer was applied so as to give an amount of the paint coated (W BC) of 2.0 g/m².

COMPARATIVE EXAMPLE 2

A sample of Comparative Example 2 was prepared in the same manner as with Example 1 with the exception that the magnetic paint for formation of the magnetic layer was applied so as to give an amount of the paint coated (W MAG) of 1.5 g/m², and the paint for formation of the backcoat layer was applied so as to give an amount of the paint coated (W BC) of 4.0 g/m².

COMPARATIVE EXAMPLE 3

A sample of Comparative Example 3 was prepared in the same manner as with Example 1 with the exception that the magnetic paint for formation of the magnetic layer was applied so as to give an amount of the paint coated (W MAG) of 1.5 g/m², and the paint for formation of the backcoat layer was applied so as to give an amount of the paint coated (W BC) of 12.0 g/m².

COMPARATIVE EXAMPLE 4

A sample of Comparative Example 4 was prepared in the same manner as with Example 1 with the exception that the magnetic paint for formation of the magnetic layer was applied so as to give an amount of the paint coated (W MAG) of 1.5 g/m², and the paint for formation of the backcoat layer was applied so as to give an amount of the paint coated (W BC) of 26.0 g/m².

COMPARATIVE EXAMPLE 5

A sample of Comparative Example 5 was prepared in the same manner as with Example 1 with the exception that the magnetic paint for formation of the magnetic layer was applied so as to give an amount of the paint coated (W MAG) of 6.0 g/m², and the paint for formation of the backcoat layer was applied so as to give an amount of the paint coated (W BC) of 2.5 g/m².

COMPARATIVE EXAMPLE 6

A sample of Comparative Example 6 was prepared in the same manner as with Example 1 with the exception that the magnetic paint for formation of the magnetic layer was applied so as to give an amount of the paint coated (W MAG) of 10.0 g/m², and the paint for formation of the backcoat layer was applied so as to give an amount of the paint coated (W BC) of 2.0 g/m².

COMPARATIVE EXAMPLE 7

A sample of Comparative Example 7 was prepared in the same manner as with Example 1 with the exception that the magnetic paint for formation of the magnetic layer was applied so as to give an amount of the paint coated (W MAG) of 15.0 g/m², and the paint for formation of the backcoat layer was applied so as to give an amount of the paint coated (W BC) of 2.0 g/m².

COMPARATIVE EXAMPLE 8

A sample of Comparative Example B was prepared in the same manner as with Example 1 with the exception that the magnetic paint for formation of the magnetic layer was applied so as to give an amount of the paint coated (W MAG) of 15.0 g/m², and the paint for formation of the backcoat layer was applied so as to give an amount of the paint coated (W BC) of 26.0 g/m².

COMPARATIVE EXAMPLE 9

A sample of Comparative Example 9 was prepared in the same manner as with Example 1 with the exception that the magnetic paint for formation of the magnetic layer was applied so as to give an amount of the paint coated (W MAG) of 30.0 g/m², and the paint for formation of the backcoat layer was applied so as to give an amount of the paint coated (W BC) of 12.0 g/m².

COMPARATIVE EXAMPLE 10

A sample of Comparative Example 10 was prepared in the same manner as with Example 1 with the exception that the magnetic paint for formation of the magnetic layer was applied so as to give an amount of the paint coated (W MAG) of 41.0 g/m², and the paint for formation of the backcoat layer was applied so as to give an amount of the paint coated (W BC) of 2.0 g/m².

COMPARATIVE EXAMPLE 11

A sample of Comparative Example 11 was prepared in the same manner as with Example 1 with the exception that the magnetic paint for formation of the magnetic layer was applied so as to give an amount of the paint coated (W MAG) of 41.0 g/m², and the paint for formation of the backcoat layer was applied so as to give an amount of the paint coated (W BC) of 26.0 g/m².

Figure 3:
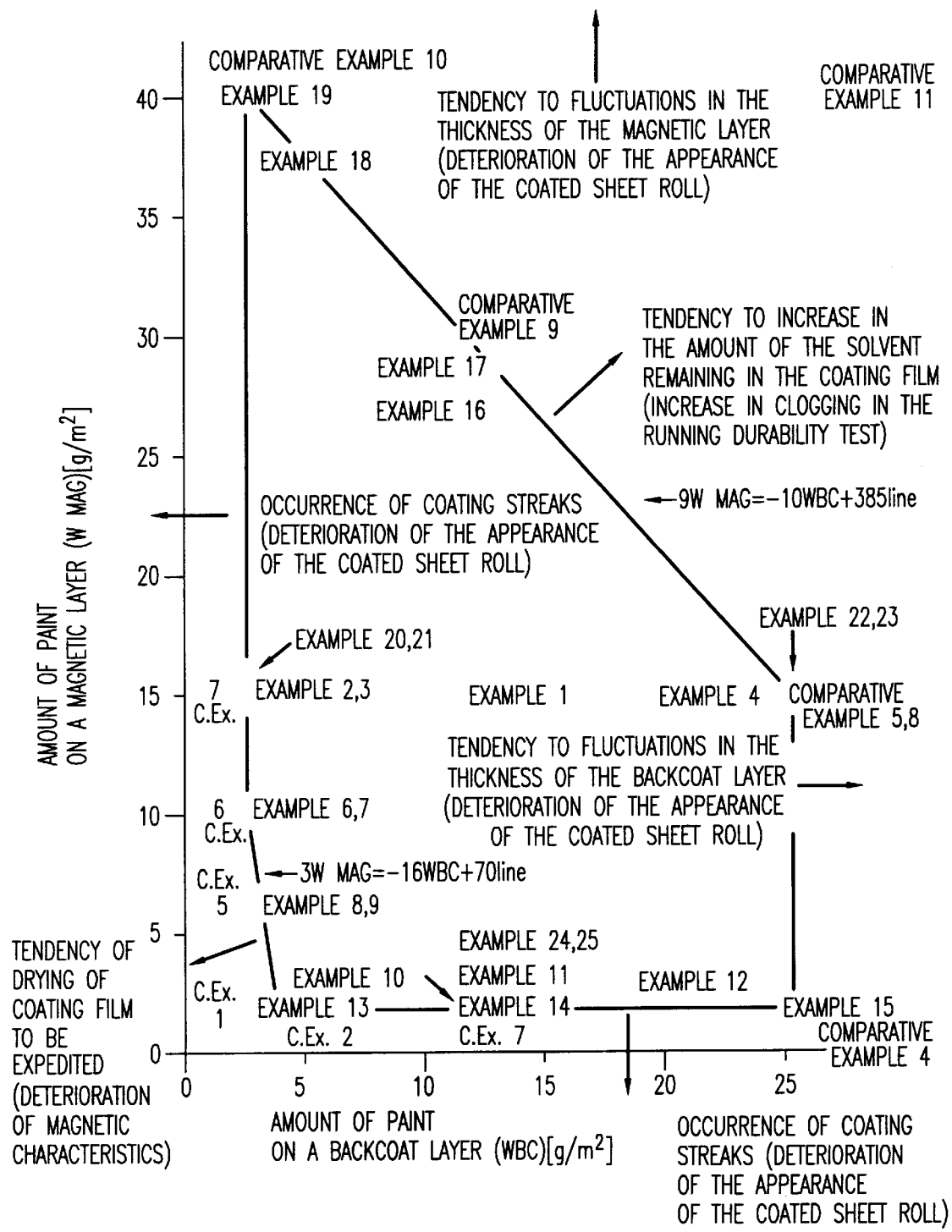
FIG. 3 is a graph in which amounts of the paint coated on magnetic layers (W MAG) and amounts of the paint coated on backcoat layers (W BC) in Examples and Comparative Examples of the present invention are plotted.

The characteristics of the magnetic recording media thus obtained are shown in Tables 1 and 2 and FIG. 3.

TABLE 1

| | Amount Coated (Magnetic Layer Side) W MAG [g/m²] | Amount Coated (BC Layer Side) W BC [g/m²] | Magnetic Layer Side | | | BC Layer Side | | | Appearance of Raw Sheet Roll after Winding [—] | Magnetic Characteristic Degree of Orientation [—] | Electromagnetic Characteristic Y-S/N [dB] | Running Durability Clogging [—] |
|---|---|---|---|---|---|---|---|---|---|---|---|---|
| | | | solid content [wt %] | Amount of Low Boiling point Solvent [wt %] | Amount of High Boiling point Solvent [wt %] | solid content [wt %] | Amount of Low Boiling point Solvent [wt %] | Amount of High Boiling point Solvent [wt %] | | | | |
| Example 1 | 15.0 | 12.0 | 25.0 | 30.0 | 30.0 | 12.0 | 30.0 | 30.0 | ◯ | 2.65 | 0 | ◯ |
| Example 2 | 15.0 | 2.5 | 25.0 | 30.0 | 30.0 | 12.0 | 30.0 | 30.0 | △ | 2.60 | −0.3 | ◯ |
| Example 3 | 15.0 | 3.5 | 25.0 | 30.0 | 30.0 | 12.0 | 30.0 | 30.0 | ◯ | 2.63 | −0.1 | ◯ |
| Example 4 | 15.0 | 23.0 | 25.0 | 30.0 | 30.0 | 12.0 | 30.0 | 30.0 | ◯ | 2.64 | +0.1 | ◯ |
| Example 5 | 15.0 | 25.0 | 25.0 | 30.0 | 30.0 | 12.0 | 30.0 | 30.0 | △ | 2.62 | ±0.0 | △ |
| Example 6 | 10.0 | 2.5 | 25.0 | 30.0 | 30.0 | 12.0 | 30.0 | 30.0 | △ | 2.59 | −0.5 | ◯ |
| Example 7 | 10.0 | 3.5 | 25.0 | 30.0 | 30.0 | 12.0 | 30.0 | 30.0 | ◯ | 2.62 | −0.2 | ◯ |
| Example 8 | 6.0 | 3.5 | 25.0 | 30.0 | 30.0 | 12.0 | 30.0 | 30.0 | ◯ | 2.56 | −0.3 | ◯ |
| Example 9 | 6.0 | 4.5 | 25.0 | 30.0 | 30.0 | 12.0 | 30.0 | 30.0 | ◯ | 2.60 | −0.2 | ◯ |
| Example 10 | 3.0 | 5.0 | 25.0 | 30.0 | 30.0 | 12.0 | 30.0 | 30.0 | ◯ | 2.60 | −0.3 | ◯ |
| Example 11 | 3.0 | 12.0 | 25.0 | 30.0 | 30.0 | 12.0 | 30.0 | 30.0 | ◯ | 2.76 | −0.2 | ◯ |
| Example 12 | 3.0 | 23.0 | 25.0 | 30.0 | 30.0 | 12.0 | 30.0 | 30.0 | ◯ | 2.75 | −0.2 | ◯ |
| Example 13 | 2.0 | 4.0 | 25.0 | 30.0 | 30.0 | 12.0 | 30.0 | 30.0 | △ | 2.63 | −0.5 | ◯ |
| Example 14 | 2.0 | 12.0 | 25.0 | 30.0 | 30.0 | 12.0 | 30.0 | 30.0 | △ | 2.74 | −0.4 | ◯ |
| Example 15 | 2.0 | 25.0 | 25.0 | 30.0 | 30.0 | 12.0 | 30.0 | 30.0 | △ | 2.77 | −0.3 | △ |
| Example 16 | 27.0 | 12.0 | 25.0 | 30.0 | 30.0 | 12.0 | 30.0 | 30.0 | ◯ | 2.61 | +0.2 | ◯ |
| Example 17 | 29.0 | 12.0 | 25.0 | 30.0 | 30.0 | 12.0 | 30.0 | 30.0 | △ | 2.59 | +0.3 | △ |
| Example 18 | 37.0 | 3.5 | 25.0 | 30.0 | 30.0 | 12.0 | 30.0 | 30.0 | ◯ | 2.57 | +0.4 | ◯ |
| Example 19 | 40.0 | 2.5 | 25.0 | 30.0 | 30.0 | 12.0 | 30.0 | 30.0 | △ | 2.54 | +0.4 | △ |
| Example 20 | 15.0 | 2.5 | 25.0 | 30.0 | 30.0 | 11.0 | 30.0 | 30.0 | △ | 2.63 | −0.1 | ◯ |
| Example 21 | 15.0 | 2.5 | 25.0 | 30.0 | 30.0 | 12.0 | 25.0 | 35.0 | ◯ | 2.61 | −0.3 | ◯ |
| Example 22 | 15.0 | 25.0 | 25.0 | 30.0 | 30.0 | 15.0 | 30.0 | 30.0 | △ | 2.62 | ±0.0 | ◯ |
| Example 23 | 15.0 | 25.0 | 25.0 | 30.0 | 30.0 | 12.0 | 35.0 | 25.0 | △ | 2.62 | ±0.0 | ◯ |
| Example 24 | 2.0 | 12.0 | 24.0 | 30.0 | 30.0 | 12.0 | 30.0 | 30.0 | △ | 2.78 | −0.1 | ◯ |
| Example 25 | 2.0 | 12.0 | 25.0 | 25.0 | 35.0 | 12.0 | 30.0 | 30.0 | ◯ | 2.79 | −0.1 | ◯ |

TABLE 2

| | Amount Coated (Magnetic Layer Side) W MAG [g/m²] | Amount Coated (BC Layer Side) W BC [g/m²] | Magnetic Layer Side | | | BC Layer Side | | | Appearance of Raw Sheet Roll after Winding [—] | Magnetic Characteristic Degree of Orientation [—] | Electromagnetic Characteristic Y-S/N [dB] | Running Durability Clogging [—] |
|---|---|---|---|---|---|---|---|---|---|---|---|---|
| | | | solid content [wt %] | Amount of Low Boiling point Solvent [wt %] | Amount of High Boiling point Solvent [wt %] | solid content [wt %] | Amount of Low Boiling point Solvent [wt %] | Amount of High Boiling point Solvent [wt %] | | | | |
| C. Ex. 1 | 1.5 | 2.0 | 25.0 | 30.0 | 30.0 | 12.0 | 30.0 | 30.0 | ▲ | 2.21 | −1.2 | ◯ |
| C. Ex. 2 | 1.5 | 4.0 | 25.0 | 30.0 | 30.0 | 12.0 | 30.0 | 30.0 | ▲ | 2.40 | −0.8 | ◯ |
| C. Ex. 3 | 1.5 | 12.0 | 25.0 | 30.0 | 30.0 | 12.0 | 30.0 | 30.0 | ▲ | 2.55 | −0.7 | ◯ |
| C. Ex. 4 | 1.5 | 26.0 | 25.0 | 30.0 | 30.0 | 12.0 | 30.0 | 30.0 | ▲ | 2.65 | −0.3 | △ |
| C. Ex. 5 | 6.0 | 2.5 | 25.0 | 30.0 | 30.0 | 12.0 | 30.0 | 30.0 | △ | 2.40 | −0.6 | ◯ |
| C. Ex. 6 | 10.0 | 2.0 | 25.0 | 30.0 | 30.0 | 12.0 | 30.0 | 30.0 | ▲ | 2.49 | −0.7 | ◯ |

TABLE 2-continued

|  | Amount Coated (Magnetic Layer Side) W MAG [g/m²] | Amount Coated (BC Layer Side) W BC [g/m²] | Magnetic Layer Side | | | BC Layer Side | | | Appearance of Raw Sheet Roll after Winding [—] | Magnetic Characteristic Degree of Orientation [—] | Electromagnetic Characteristic Y-S/N [dB] | Running Durability Clogging [—] |
|---|---|---|---|---|---|---|---|---|---|---|---|---|
|  |  |  | solid content [wt %] | Amount of Low Boiling point Solvent [wt %] | Amount of High Boiling point Solvent [wt %] | solid content [wt %] | Amount of Low Boiling point Solvent [wt %] | Amount of High Boiling point Solvent [wt %] |  |  |  |  |
| C. Ex. 7 | 15.0 | 2.0 | 26.0 | 30.0 | 30.0 | 12.0 | 30.0 | 30.0 | ▲ | 2.58 | −0.5 | ○ |
| C. Ex. 8 | 15.0 | 26.0 | 25.0 | 30.0 | 30.0 | 12.0 | 30.0 | 30.0 | ▲ | 2.63 | +0.1 | X |
| C. Ex. 9 | 30.0 | 12.0 | 25.0 | 30.0 | 30.0 | 12.0 | 30.0 | 30.0 | ▲ | 2.58 | +0.3 | X |
| C. Ex. 10 | 41.0 | 2.0 | 25.0 | 30.0 | 30.0 | 12.0 | 30.0 | 30.0 | ▲ | 2.54 | +0.4 | X |
| C. Ex. 11 | 41.0 | 26.0 | 25.0 | 30.0 | 30.0 | 12.0 | 30.0 | 30.0 | X | 2.52 | +0.4 | X |

C. Ex.: Comparation Example

FIG. 3 is a graph in which the amounts of the magnetic paints coated (W MAG) and the amounts of the backcoat paints coated (W BC) of Examples and Comparative Examples of the present invention are plotted.

In the graph, Example (1), . . . and Comparative Example (1), . . . indicate correspondence to W MAG and W BC of Example 1, . . . and Comparative Example 1, . . . , respectively. In the graph, a numeral surrounded by a circle indicates the corresponding example number, and an italic numeral surrounded by an ellipse indicates the corresponding comparative example number. Further, the range enclosed by a line indicates the range which fulfills the four requirements claimed in the present invention. A deficiency generated out of the range which fulfills the above-mentioned four requirements is shown by an arrow and sentences in a rectangular enclosure.

The amount of the paint coated on the magnetic layer side and the amount of the paint coated on the backcoat layer side were each determined from the following calculating equation:

[Amount of the paint coated (g/m²)]=[Flow Rate (g/minute)]/{[Speed (m/minute)]×[Coating Width (m)]} wherein the flow rate indicates the amount of each paint supplied to the extrusion nozzle 20 or 30.

For each of the above-mentioned samples (samples of Examples 1 to 25 and Comparative Examples 1 to 11), "the appearance of the coated sheet roll after winding","the magnetic characteristics (rectangularity ratio)", "the electromagnetic characteristics (Y-S/N)" and "the running durability test" were evaluated.

As apparent from Tables 1 and 2 and FIG. 1, when the amount of the paint coated on the backcoat layer side is small and the amount of the magnetic paint coated on the magnetic layer side is small, drying of the coating film is expedited to deteriorate the magnetic characteristics. When the amount of the paint coated on the backcoat layer side is small, coating streaks occur (the appearance of the coated sheet roll is deteriorated), even if the amount of the paint coated on the magnetic layer side is sufficient. Further, even if the amount of the paint coated on the backcoat layer side is sufficient, a small amount of the magnetic paint coated on the magnetic layer side causes occurrence of coating streaks (deterioration of the appearance of the coated sheet roll), and a large amount of the magnetic paint coated on the magnetic layer side causes a deficiency such as a tendency to an increase in the residual solvent (an increase in clogging in the running durability test) or a tendency to fluctuations in the thickness of the magnetic layer (deterioration of the appearance of the coated sheet roll).

Evaluation methods are as follows:

Appearance of Coated Sheet Roll after Winding

A coated sheet roll wound on a winder after calendering treatment was visually observed and evaluated according to the following four-grade system:

○: The appearance of the coated sheet roll is good and has no problem.

Δ: The appearance of the coated sheet roll is slightly uneven, but has no problem with respect to tape qualities.

▲: The appearance of the coated sheet roll is partly uneven, and that uneven portion is discarded after cutting.

x: The appearance of the coated sheet roll is poor, and the coated sheet roll is discarded.

Maqnetic Characteristic (Degree of Orientation)

The magnetic characteristic of a tape sample was measured with an oscillatory type fluxmeter (Type VSM-V manufactured by Toei Kogyo Co.) at a maximum external magnetic field of 10 kOe.

The degree of orientation is defined as $(Br/Bm)MD/(Br/Bm)TD$, wherein $Bm$ represents the saturation magnetic flux density, MD represents the longitudinal direction of the tape, and TD represents the width direction of the tape.

Electromagnetic Characteristic (Y-S/N)

A 50%-level video signal was recorded on and reproduced from a tape sample at a reference level to determine the S/N with a 925D noise meter manufactured by Shibasoku Co., the relative value taking the Y-S/N of Example 1 as 0 dB was determined.

Deck Used: EV-S900 (Hi8 format VTR) manufactured by Sony Corp.

Running Durability Test (Degree of Occurrence of Clogging)

The reciprocating running of a tape sample was repeated 100 times for 50 reels on a VTR under the circumstances of 0° C. and 80% RH, and 40° C. and 80% RH, and the occurrence of running troubles such as running stoppage and head clogging was observed to evaluate the running durability based on the following criterion.

Deck Used: EV-S900 (Hi8 format VTR) manufactured by Sony Corp.

○: No troubles occurred.

Δ: Troubles occurred for one reel.

x: Troubles occurred for two or more reels.

From the above-mentioned results, the effects of the present invention are apparent. That is to say, according to the present invention, both sides of the non-magnetic support are coated with the paints for formation of the coating films so that the amount of the paint coated on one side (the magnetic layer side) of the non-magnetic support (W MAG) and the amount of the paint coated on the other side (the backcoat layer side) thereof (W BC) fulfill the specific requirements, and the coating films formed on both sides are simultaneously dried, thereby being able to produce the magnetic recording medium excellent in electromagnetic characteristics, magnetic characteristics and running durability without deteriorating the appearance of the coated sheet roll after winding.

What is claimed is:

1. A method for producing a magnetic recording medium comprising coating both sides of a non-magnetic support with paints for formation of coating films, followed by simultaneous drying of the respective coating films, in which the following four requirements are fulfilled, taking the amount of the paint coated on one magnetic layer side of the non-magnetic support as "W MAG" and the amount of the paint coated on the other backcoat layer side thereof as "W BC":

$2.0 \text{ g/m}^2 \leq \text{W MAG} \leq 40.0 \text{ g/m}^2$ (1)

$2.5 \text{ g/m}^2 \leq \text{W BC} \leq 25.0 \text{ g/m}^2$ (2)

$3 \text{ W MAG} \geq -16 \text{ W BC} + 70$ (3)

$9 \text{ W MAG} \leq -10 \text{ W BC} + 385$ (4).

2. The method according to claim 1, in which when the amount of the paint coated on the magnetic layer side is about 2.0 g/m$^2$, at least 30% by weight of an organic solvent with a high boiling point of at least about 155° C. is present, and when the amount of the paint coated is about 40.0 g m$^2$, at least 30% by weight of an organic solvent with a low boiling point of not higher than about 80° C. is present.

3. The method according to claim 1, in which when the amount of the paint coated on the magnetic layer side is about 2.0 g/m$^2$, the solid content is lower than 25% by weight, and conversely, when the amount of the paint coated is about 40.0 g/m$^2$, the solid content is at least 30% by weight.

4. The method according to claim 1, in which when the amount of the paint coated on the backcoat layer side is about 2.5 g/m$^2$, at least 30% by weight of an organic solvent with a high boiling point of at least about 155° C. is present, and when the amount of the paint coated is about 25.0 g/m$^2$, at least 30% by weight of an organic solvent with a low boiling point not higher than about 80° C. is present.

5. The method according to claim 1, in which when the amount of the paint coated on the backcoat layer side is about 2.5 g/m$^2$, the solid content is lower than 12% by weight, and conversely, when the amount of the paint coated is about 25.0 g/m$^2$, the solid content is at least 15% by weight.

6. The method according to claim 1, in which drying and calendering of the magnetic layer and the backcoat layer are continuously carried out in line.

* * * * *